(12) United States Patent
Del-Gallo et al.

(10) Patent No.: US 9,034,282 B2
(45) Date of Patent: May 19, 2015

(54) CATALYTIC REACTOR INCLUDING ONE CELLULAR AREA HAVING CONTROLLED MACROPOROSITY AND A CONTROLLED MICROSTRUCTURE AND ONE AREA HAVING A STANDARD MICROSTRUCTURE

(75) Inventors: Pascal Del-Gallo, Dourdan (FR); Daniel Gary, Montigny le Bretonneux (FR); Mathieu Cornillac, Gilles les Bains (FR); Aude Cuni, Frankfurt (DE)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 539 days.

(21) Appl. No.: 13/513,376

(22) PCT Filed: Nov. 24, 2010

(86) PCT No.: PCT/FR2010/052504
§ 371 (c)(1),
(2), (4) Date: Jun. 1, 2012

(87) PCT Pub. No.: WO2011/067509
PCT Pub. Date: Jun. 9, 2011

(65) Prior Publication Data
US 2012/0241674 A1    Sep. 27, 2012

(30) Foreign Application Priority Data
Dec. 1, 2009   (FR) .................................... 09 58554

(51) Int. Cl.
*B01J 8/04*      (2006.01)
*C01B 3/40*      (2006.01)
*C01B 3/16*      (2006.01)
(Continued)

(52) U.S. Cl.
CPC ....... *B01J 8/0453* (2013.01); *C01B 2203/0238* (2013.01); *C01B 2203/1029* (2013.01); *C01B 2203/0244* (2013.01); *B01J 19/2485* (2013.01); *B01J 19/2495* (2013.01); *C01B 3/16* (2013.01); *C01B 3/40* (2013.01); *C01B 2203/0233* (2013.01); *C01B 2203/0283* (2013.01);
(Continued)

(58) Field of Classification Search
None
See application file for complete search history.

(56) References Cited

U.S. PATENT DOCUMENTS
6,921,516 B2 * 7/2005 Goebel et al. ................. 422/604
2007/0238610 A1 * 10/2007 Chen et al. .................... 502/330

FOREIGN PATENT DOCUMENTS
EP         1 216 751      6/2002
GB         2 423 489      8/2006
WO     WO 2009/138432    11/2009

OTHER PUBLICATIONS
International Search Report for PCT/FR2010/052504, mailed Mar. 4, 2011.

*Primary Examiner* — Jennifer A Leung
(74) *Attorney, Agent, or Firm* — Christopher J. Cronin

(57) ABSTRACT

The invention relates to a catalytic reactor including: at least one first architecture/microstructure including a ceramic and/or metal cellular architecture having a pore size of 2 to 80 ppi and a macroporosity of more than 85%, and a microstructure having a grain size of 100 nm to 5 microns, and skeleton densification of more than 95%, and a catalytic layer; and at least one second architecture/microstructure including a spherical or cylindrical architecture having a pore size of 0.1 to 100 μm and a macroporosity of less than 60%, and a microstructure having a grain size of 20 nm to 10 μm and a skeleton densification of 20% to 90%, and a catalytic layer; the first and second architecture/microstructure being stacked inside said reactor.

15 Claims, 1 Drawing Sheet

(51) Int. Cl.
*B01J 19/24* (2006.01)
*C04B 38/06* (2006.01)
*C04B 111/00* (2006.01)

(52) U.S. Cl.
CPC ............... *C01B2203/1005* (2013.01); *C04B 38/062* (2013.01); *C04B 2111/0081* (2013.01)

CATALYTIC REACTOR INCLUDING ONE CELLULAR AREA HAVING CONTROLLED MACROPOROSITY AND A CONTROLLED MICROSTRUCTURE AND ONE AREA HAVING A STANDARD MICROSTRUCTURE

CROSS-REFERENCE TO RELATED APPLICATIONS

This application is a §371 of International PCT Application PCT/FR2010/052504, filed Nov. 24, 2010, which claims §119(a) foreign priority to French patent application 0958554, filed Dec. 1, 2009.

BACKGROUND

1. Field of the Invention

A subject matter of the present invention is a catalytic reactor comprising at least one architecture comprising a catalytic ceramic or metal foam of controlled macroporosity and controlled microstructure, and at least one standard architecture. Standard architecture is understood to mean the architectures conventionally employed by manufacturers of catalysts, namely drums, rods, beads, tablets, and the like.

2. Related Art

The performances of fixed bed catalytic reactors, in particular steam reforming reactors, are directly related to the structure of the catalytic bed. Structure of the catalytic bed is understood to mean the stacking of the catalysts of identical or different architecture (drums, spheres, rods, and the like) in the associated industrial reactor. Cellular structures have not currently been developed at the industrial level. Mention will be made, by way of example, of the various stacks in water-gas shift reactors (reactor involved in the water-gas reaction) (successive catalytic beds of identical architecture but of different microstructure). In these scenarios, a catalytic bed structure present in an industrial reactor can be the successive stacking of a volume A of catalyst, of a volume B of catalyst and of a volume C of catalyst. A, B and C differ either in their architecture(s) (geometric form, stack porosity, and the like), or in their microstructure(s) (chemical formulation, size of the micropores, size and distributions of active phases, and the like), or in their architecture(s)/microstructure(s). Generally, the standard architecture of catalytic beds is composed of drums comprising one or more holes, of pills, of rods, of spheres, and the like.

A high performance catalytic bed structure has to simultaneously:

exhibit a maximum surface area/volume ratio ($m^2/m^3$), in order to increase the exchange geometric surface area and thus indirectly the catalytic effectiveness, improve the density of the filling of a tube in comparison with a random filling brought about by conventional structures (sphere, pellet, cylinder, drum, and the like), minimize pressure drops along the bed (between the inlet and the outlet of the catalytic reactor), provide heat transfer of increased maximum axial and/or radial effectiveness. Axial is understood to mean along the axis of the catalytic reactor and radial is understood to mean from the internal or external wall of the catalytic reactor to the center of the catalytic bed, meet the thermomechanical and/or thermochemical stresses endured by the bed.

The overall structuring of a fixed bed catalytic reactor is a multiscale "phenomenon":

the microstructure of the material (catalyst) itself, namely its chemical formulation, the micro- and/or mesoporosity, the size and the dispersion of the active phase(s), the thickness of the deposited layer(s), and the like, the architecture of the catalyst, that is to say its geometric form (granules, drums, honeycomb monoliths, cellular structures of foam type, spheres, pills, rods, and the like), the structure of the bed within the reactor (successive stacking of several volumes of catalytic materials which are different either in terms of microstructure, or in terms of architecture, or both), that is to say the arrangement of the catalytic materials of controlled architecture and/or controlled microstructure within the catalytic reactor. It is possible to envisage, for example, as structure of catalytic bed(s), successive stacks with or without the addition of noncatalytic elements of varied functionalities.

Starting from this, a problem which arises is that of providing a catalytic reactor exhibiting an improved performance.

SUMMARY OF THE INVENTION

A solution of the present invention is a catalytic reactor comprising:

at least one first architecture/microstructure (1) comprising:
  a ceramic and/or metal cellular architecture with a pore size, expressed in mm, of between 0.3175 mm and 12.7 mm in mean diameter [between 2 and 80 ppi (pores per inch)] and a macroporosity of greater than 85%, and a microstructure having a grain size of between 100 nm and 5 µm, preferably between 200 nm and 3 µm, and a densification of the skeleton of greater than 95%; and
  a catalytic layer, at least one second architecture/microstructure (2) comprising:
  an architecture of spherical or cylindrical geometric form with a pore size of between 0.1 and 100 µm and a macroporosity of less than 60%, and a microstructure having a grain size of between 20 nm and 10 µm, preferably between 0.5 and 5 µm, and a densification of the skeleton of between 20 and 90%, preferably between 50 and 80%; and
  a catalytic layer, the first architecture/microstructure and the second architecture/microstructure being stacked within said reactor.

DETAILED DESCRIPTION OF THE INVENTION

Figure 1:
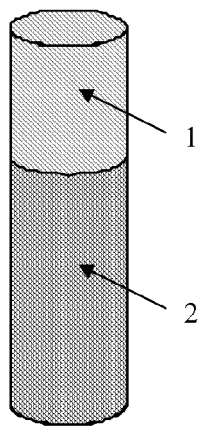
FIG. 1 is a schematic of an embodiment of the invention where the stacked first and second architectures.

The stacking of the two architectures is represented in FIG. 1. It should be noted that the relative heights of the different architectures are merely indicative.

The densification of the ceramic and/or metal skeleton is preferably measured by scanning electron microscopy (SEM) or by Archimedes' principle.

Pore size is understood to mean the microporous volume developed by the ceramic and/or metal skeleton. Generally, this microporous volume, in the context of the ceramic and/or metal cellular architectures, is very low (no development of specific micro- and mesoporosity) and less than 0.1 g/cm³. This results in an absence of micro- and mesoporosity. The existing porosity is a macroporosity related to the stacking of the ceramic particles forming the cellular architecture. In the case of the ceramic and/or metal skeletons, as the densification is greater than 95% the residual macroporosity is essentially closed, in contrast to a standard architecture/microstructure of a catalytic support of drum, pill or rod type, and the like.

Grain size is understood to mean in particular the individual ceramic grains with a size of between 100 nm and 5 microns, preferably between 200 nm and 3 μm, the size corresponding to the diameter of the grain.

The catalytic cellular architecture is preferably a catalytic ceramic or metal foam. Catalytic is understood to mean the presence, at the surface of the cellular architecture, of a catalyst.

Foams made of ceramic, indeed even of metal alloy, are known to be used as catalyst support for chemical reactions, in particular heterogeneous catalysis reactions. These foams are particularly advantageous for highly exo- or endothermic reactions (e.g.: exothermic Fischer-Tropsch reaction, water-gas shift reaction, partial oxidation reaction, methanation reaction, and the like) and/or for catalytic reactors where it is desired to obtain high space velocities (reaction for the steam reforming of natural gas, naphtha, LPG, and the like).

The stacking of the architectures within the catalytic reactor according to the invention makes it possible to combine the performance of the catalytic foams, as regards high surface area/volume ratio, efficient heat transfer, limitation on the pressure drops and meeting thermomechanical and/or thermochemical stresses, with "standard" catalysts with reduced performances but with a potentially lower cost.

Figure 2:
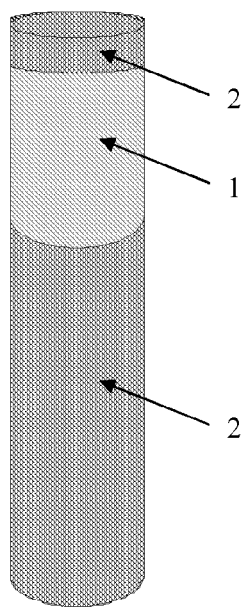
FIG. 2 is a schematic of an embodiment of the invention where the first architecture is stacked between two of the second architectures.
Figure 3:
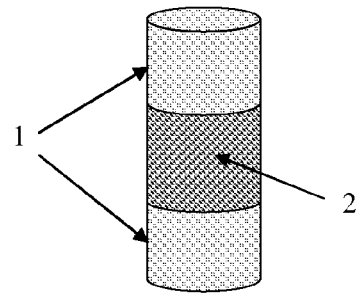
FIG. 3 is a schematic of an embodiment of the invention where the second architecture is stacked between two of the first architectures.

As the case may be, the reactor according to the invention can exhibit one or more of the following characteristics:

the first architecture/microstructure (1) is comprised between 2 second architectures/microstructures (2). This stacking makes it possible to avoid possible preferred flows between the walls of the reactor and the first architecture-microstructure. The stacking of the 3 architectures is represented in FIG. 2;

the second architecture/microstructure (2) is comprised between 2 first architectures-microstructures (1); preferably, one of these 2 first architectures/microstructures is situated on the side of the inlet for the gas to be treated and the other is situated on the side of the outlet for the gas produced. This is because the region on the side of the outlet for the gas produced is subjected to higher temperatures and, if the ceramic and/or metal cellular architecture exhibits superior thermomechanical properties to the architecture of spherical or cylindrical geometric form, this stacking of architectures may make it possible to optimize the overall strength of the stacking of the architectures. The stacking of the 3 architectures is represented in FIG. 3;

each architecture can be divided into at least 2 sub-architectures having different macroporosities and/or microporosities;

the ceramic and/or metal cellular architecture comprises at least one porosity gradient which is continuous and/or discontinuous and radial and/or axial over the whole of said architecture;

said reactor comprises an inlet for the gas to be treated and an outlet for the gas produced and the first architecture/microstructure (1) is placed on the side of the inlet for the gas to be treated. This is because it is here where the highest catalytic activity by volume is desired and where a maximum radial heat transfer is desired, in order to reduce the radial temperature gradients, which are more marked on the side of the inlet for the gas to be treated;

the second architecture/microstructure is composed of drums, granules, powders, spheres, rods, pills or a mixture of these elements.

It should be noted that, in FIGS. 2 and 3, the relative heights of the various architectures are merely indicative.

The cellular architectures are manufactured from a matrix made of a polymer material chosen from polyurethane (PU), poly(vinyl chloride) (PVC), polystyrene (PS), cellulose and latex but the ideal choice of the foam is limited by strict requirements.

The polymer material must not release toxic compounds; for example, PVC is avoided as it may result in the release of hydrogen chloride.

The catalytic cellular architecture, when it is of ceramic nature, typically comprises inorganic particles, chosen from alumina ($Al_2O_3$) and/or doped alumina (La (1 to 20% by weight)-$Al_2O_3$, Ce (1 to 20% by weight)-$Al_2O_3$, Zr (1 to 20% by weight)-$Al_2O_3$), magnesia (MgO), spinel ($MgAl_2O_4$), hydrotalcites, CaO, silicocalcareous products, silicoaluminous products, zinc oxide, cordierite, mullite, aluminum titanate and zircon ($ZrSiO_4$), or ceramic particles, chosen from ceria ($CeO_2$), zirconium oxide ($ZrO_2$), stabilized ceria ($Gd_2O_3$ between 3 and 10 mol % in ceria) and stabilized zirconium ($Y_2O_3$ between 3 and 10 mol % in zirconium) and mixed oxides of formula (I):

$$Ce_{(1-x)}Zr_xO_{(2-\delta)} \quad (I),$$

where $0<x<1$ and $\delta$ provides for the electrical neutrality of the oxide, or doped mixed oxides of formula (II):

$$Ce_{(1-x-y)}Zr_xD_yO_{2-\delta} \quad (II),$$

where D is chosen from magnesium (Mg), yttrium (Y), strontium (Sr), lanthanum (La), praseodymium (Pr), samarium (Sm), gadolinium (Gd), erbium (Er) or ytterbium (Yb), where $0<x<1$, $0<y<0.5$ and $\delta$ provides for the electrical neutrality of the oxide.

The catalytic reactor according to the invention can be used to produce gaseous products, in particular a syngas.

The feed gas preferably comprises oxygen, carbon dioxide or steam mixed with methane. However, these catalytic bed structures can be deployed over all the catalytic reactors of the process for the production of hydrogen by steam reforming, namely, in particular, prereforming, reforming and water-gas shift (water-gas reaction) beds.

The reaction temperatures which are employed are high and are between 200 and 1000° C., preferably between 400 and 1000° C.

The pressure of the reactants (CO, $H_2$, $CH_4$, $H_2O$, $CO_2$, and the like) can be between 10 and 50 bar, preferably between 15 and 35 bar.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A catalytic reactor comprising at least one first architecture/microstructure and at least one second architecture/microstructure wherein:

said at least one first architecture/microstructure comprises
  a porous ceramic and/or metal cellular architecture having:
    a pore density of 2 to 80 pores per inch where the pores have a mean diameter size of between 0.3175 mm and 12.7 mm,
    a macroporosity of greater than 85%,
    a microstructure having a grain size of between 100 nm and 5 microns,
    a densification of the skeleton of greater than 95%, and
    a catalytic layer,
said at least one second architecture/microstructure comprises a porous spherical or cylindrical geometric form having:
    a pore size of between 0.1 and 100 μm,
    a macroporosity of less than 60%,
    a microstructure having a grain size of between 20 nm and 10 μm,
    a densification of the skeleton of between 20 and 90%, and
    a catalytic layer; and
  the at least one first architecture/microstructure and the at least one second architecture/microstructure are stacked within said reactor.

2. The catalytic reactor of claim 1, wherein the at least one first architecture/microstructure is disposed between two second architectures/microstructures.

3. The catalytic reactor of claim 1, wherein the at least one second architecture/microstructure is disposed between two first architectures/microstructures.

4. The catalytic reactor of claim 1, wherein each of said at least one first architecture/microstructure is divided into at least two first sub-architectures each of which has a different macroporosity.

5. The catalytic reactor of claim 1, wherein each of said at least one first architecture/microstructure is divided into at least two first sub-architectures each of which has a different microporosity.

6. The catalytic reactor of claim 1, wherein each of said at least one first architecture/microstructure is divided into at least two first sub-architectures each of which has a different macroporosity and microporosity.

7. The catalytic reactor of claim 1, wherein each of said at least one second architecture/microstructure is divided into at least two second sub-architectures each of which has a different macroporosity.

8. The catalytic reactor of claim 1, wherein each of said at least one second architecture/microstructure is divided into at least two second sub-architectures each of which has a different microporosity.

9. The catalytic reactor of claim 1, wherein each of said at least one second architecture/microstructure is divided into at least two second sub-architectures each of which has a different macroporosity and microporosity.

10. The catalytic reactor of claim 1, wherein the ceramic and/or metal cellular architecture comprises at least one porosity gradient which is continuous and radial and/or axial over the whole of said architecture.

11. The catalytic reactor of claim 1, wherein the ceramic and/or metal cellular architecture comprises at least one porosity gradient which is discontinuous and radial and/or axial over the whole of said architecture.

12. The catalytic reactor of claim 1, wherein said reactor has an inlet on one side thereof for a gas to be treated and an outlet on another side thereof for a gas produced and the at least one first architecture/microstructure is placed on the side of the inlet side.

13. The catalytic reactor of claim 1, wherein a structure of the at least one second architecture/microstructure is selected from the group consisting of drums, granules, powders, spheres, rods, pills, and mixtures thereof.

14. A method of producing syngas, comprising the step of producing syngas from a feed gas comprising oxygen and/or carbon dioxide and/or steam mixed with methane, wherein:
  the reactor of claim 1 is used as a pre-reforming bed, a reforming bed and/or a water-gas shift bed;
  the reactor is maintained at a reaction temperature of between 200 and 1000° C.; and
  a pressure of gaseous reactants fed to the reactor or gaseous products produced by the reactor are at a pressure of between 10 and 50 bar.

15. The method of claim 14, wherein the pressure of the gaseous reactants fed to the reactor or gaseous products produced by the reactor are at a pressure of between 15 and 35 bar.

* * * * *